United States Patent [19]

Felix et al.

[11] Patent Number: 5,153,285
[45] Date of Patent: Oct. 6, 1992

[54] PROCESS FOR THE PREPARATION OF TETRAFLUOROETHYLENE POLYMER IN AQUEOUS SUSPENSION

[75] Inventors: Bernd Felix; Gernot Löhr; Willibald Hofmeister; Rolf Hengel, all of Burgkirchen, Fed. Rep. of Germany

[73] Assignee: Hoechst Aktiengesellschaft, Frankfurt am Main, Fed. Rep. of Germany

[21] Appl. No.: 728,692

[22] Filed: Jul. 11, 1991

[30] Foreign Application Priority Data

Jul. 13, 1990 [DE] Fed. Rep. of Germany ....... 4022405

[51] Int. Cl.$^5$ .......................... C08F 2/00; C08F 14/18
[52] U.S. Cl. ..................... 526/206; 526/236; 526/247; 526/249; 526/255
[58] Field of Search ............... 526/206, 236, 247, 249, 526/255

[56] References Cited

U.S. PATENT DOCUMENTS

| | | |
|---|---|---|
| 2,393,967 | 2/1946 | Brubaker . |
| 2,394,243 | 2/1946 | Joyce . |
| 2,936,301 | 5/1960 | Thomas et al. . |
| 3,726,483 | 4/1973 | Kometani et al. ...................... 241/5 |
| 3,780,007 | 12/1973 | Stallings ............................... 526/255 |
| 4,576,869 | 3/1986 | Malhotra ............................. 526/255 |

FOREIGN PATENT DOCUMENTS

| | | | |
|---|---|---|---|
| 0103975 | 3/1984 | European Pat. Off. ............ 526/255 |
| 39-12118 | 6/1964 | Japan .................................. 526/255 |
| 45-9071 | 4/1970 | Japan .................................. 526/255 |
| 47-29577 | 8/1972 | Japan .................................. 526/255 |
| 51-2503 | 1/1976 | Japan .................................. 526/255 |
| 1161023 | 8/1969 | United Kingdom ................ 526/255 |

Primary Examiner—Joseph L. Schofer
Assistant Examiner—N. Sarofim

[57] ABSTRACT

In the suspension polymerization of tetrafluoroethylene a mixture of tetrafluoroethylene and an inert gas is charged under pressure before starting the polymerization, the total pressure being 5 to 50 bar and the concentration of tetrafluoroethylene in this mixture being 30 to 70 mol %. Said concentration is kept within this range by an appropriate feed of tetrafluoroethylene during the polymerization. The granular PTFE powder obtained is distinguished by an improved grain structure and grindability.

7 Claims, No Drawings

PROCESS FOR THE PREPARATION OF TETRAFLUOROETHYLENE POLYMER IN AQUEOUS SUSPENSION

The invention relates to a process for the preparation of granular tetrafluoroethylene polymer which cannot be processed from the melt, by suspension polymerization of tetrafluoroethylene and 0 to 0.6 mol % of a modifying comonomer in an aqueous phase in the presence of free-radical forming initiators, a mixture of tetrafluoroethylene and an inert gas being charged under pressure before starting the polymerization.

The suspension polymerization of tetrafluoroethylene (TFE) in aqueous phase has been known for a long time (U.S. Pat. No. 2,393,967). It is carried out in the presence of water-soluble initiators, such as, for example, alkali metal or ammonium persulfates, percarbonates, perphosphates or perborates, or water-soluble redox initiators. Buffers and precipitants are also usually added in the course of the polymerization. The air in the remaining gas space of the reactor is carefully removed and TFE is charged, it being possible for the polymerization pressure to be between 4 and 30 bar. After the polymerization has started, gaseous TFE corresponding to the amount of polymer formed is usually fed in while the polymerization pressure is kept constant.

The TFE polymers obtained in this manner by suspension polymerization are usually described as granular PTFE. They contain comonomers only as so-called modifying agents, i.e. to such a small extent that the TFE polymer retains the characteristic of PTFE homopolymer, of not being processible from the melt ("non-melt-fabricable"). Granular PTFE differs in principle from the second type of PTFE powders, the so-called fine powders, which are obtained by polymerization in the presence of fluorinated emulsifiers to give aqueous colloidal dispersions, which are subsequently coagulated, in respect of its grain structure, specific surface area, its powder properties and processing properties and its possible uses.

The present invention is concerned with the preparation and working up of granular PTFE. It is known to those skilled in the art that the suspension polymers of TFE obtained direct from the polymerization reactor by customary processes are produced in the form of fibrous, irregular particles which are too coarse for most processing purposes. Crude polymer powders of this type can only be processed further with the greatest difficulty because of their poor flowability, their low bulk density and their excessively large average particle diameter, which as a rule is over 1500 $\mu$m. In most cases such crude polymers are subjected to grinding down to average particle diameters of <200 $\mu$m, as a result of which the mechanical and electrical properties of shaped articles produced therefrom are improved.

Particularly in cases where automatic metering equipment is employed for the customary further processing methods of granular PTFE by the so-called compression/sinter technique or by ram extrusion, as is generally customary nowadays, trouble-free metering with crude polymer powder is not possible. The poor flowability results in frequent blockages in the material flow of the metering, and the excessively low bulk density hinders adequate utilization of the capacity of the equipment, since too little material can be introduced per working cycle. The excessively coarse grain causes excessively high porosity and inadequate smoothness of the surface of articles shaped therefrom.

It has therefore been known for a long time to improve the processibility of granular PTFE molding powders of this type by so-called agglomeration processes in agitated liquid media under the action of mechanical forces. Liquid agglomeration media of this type which have been described are water, organic liquids capable of wetting PTFE, amino-substituted and/or hydroxyl-substituted alkanes or mixtures of water and organic liquids which are substantially insoluble in water. The requirement for an agglomeration process of this type is prior grinding of the crude polymer obtained to an average particle diameter of <200 mm. In a customary process, such as is described, for example, in U.S. Pat. No. 2,936,301, a grinding of this type is advantageously carried out in a gas jet mill, but the flow properties achieved with this are not adequate for automatic metering. Before the grinding process it is necessary to carry out a washing and drying process, and this is hindered to an extraordinary degree by the poor handling properties. For this reason it has become customary to precede the drying and fine grinding of the granular TFE crude polymer by wet grinding by means of a cutting device, in the course of which the washing of the crude polymer and the removal of the polymerization auxiliaries are effected at the same time. However, this wet grinding stage constitutes a measure which is time-consuming and susceptible to trouble and which one would be glad to dispense with. The object of the present invention is to make this possible by imparting an improved grain structure to the crude polymer.

This object is achieved by means of a process of the type mentioned initially, wherein the total pressure of the charged mixture is 5 to 50 bar and the concentration of the tetrafluoroethylene in this mixture is 30 to 70 mol %, said concentration being kept within this range by an appropriate feed of tetrafluoroethylene during the polymerization.

The suspension polymerization of the process according to the invention is carried out in an aqueous phase with stirring and under conditions which are otherwise customary. The known free-radical forming and water-soluble initiators can be used, in particular the alkali metal and ammonium salts of persulfates and percarbonates, and also water-soluble peroxides, acyl peroxides or alkali metal permanganates. It is also possible to employ redox systems containing one of the abovementioned peroxidic compounds, in particular persulfate, as the oxidizing component and containing a reducing component, such as bisulfite, hydrazine, dithionite or a water-soluble nitrogen compound which yields a diimine, such as, for example, azodicarboxylic acid and salts thereof or azodicarboxamide. The polymerization can be carried out either in a slightly acid medium or in a slightly alkaline medium. If permanganates are employed, it is advantageous to use an acid medium; in the case of all the other initiators it is advantageous to use an alkaline medium. The polymerization can, if desired, be carried out in the presence of small amounts of buffer substances, such as, in particular, ammonium salts, for example ammonium carbamate, ammonium carbonate and ammonium oxalate. It is also possible, if appropriate, for known precipitants, such as, for example, borax or inorganic, water-soluble phosphates, to be present. In order to facilitate the initial decomposition of redox systems, it is also possible, if appropriate, for small amounts of heavy metal salts to be present in concentrations of $1\times10^{-5}$ to $40\times10^{-5}\%$ by weight, relative to the total liquor, in the form of salts of, for example, bivalent copper, bivalent or trivalent iron or trivalent chromium.

The polymerization of the TFE can be carried out as a pure homopolymerization, or small amounts of a modifying comonomer, namely 0 to 0.6 mol %, preferably 0 to 0.4 mol % and, in particular—if present—0.05 to 0.4 mol %, relative to the TFE in the gas space, can be present in the polymerization. The amount of such a modifying comonomer thus incorporated into the polymer is made sufficiently small for the characteristic of PTFE—namely not to be capable of shaping from the melt—to be retained. Modifying comonomers are perfluorinated olefins and perfluoroalkyl perfluorovinyl ethers, including those which are substituted in the $\omega$-position by H, preferably hexafluoropropylene and perfluoropropyl perfluorovinyl ether and also chlorotrifluoroethylene.

If appropriate, the aqueous polymerization medium also advantageously contains small amounts of perfluorinated emulsifiers which are inactive to polymerization, such as, for example, salts of perfluorocarboxylic acids. The concentration of emulsifiers of this type should, however, not exceed 30 ppm and is preferably below 20 ppm. This amount is made sufficiently small for the polymer produced not to remain as a colloidal dispersion in the aqueous medium.

The suspension polymerization is carried out at a temperature of 5° to 90° C., preferably 10° to 40° C., this temperature being kept essentially constant during the course of the polymerization.

The polymerization of the process according to the invention is carried out in the presence of an inert gas. In this regard the total pressure built up by charging TFE and inert gas before the start of the polymerization should be 5 to 50 bar, preferably 5 to 30 bar, the concentration of TFE in the mixture charged being 30 to 70 mol %, preferably 30 to 65 mol %, of the total mixture. As is customary, the reaction vessel charged with the aqueous medium containing the polymerization ingredients is freed carefully from air or oxygen beforehand by repeated alternate evacuation and flushing with nitrogen.

When the polymerization has been initiated, TFE is fed in in an amount such that the concentration of TFE, relative to the gas mixture, is kept within said range of 30 to 70 mol %, preferably 30 to 65 mol %. In a preferred embodiment of the process according to the invention TFE is fed in essentially at the rate in which it is consumed by the polymer formed, the total pressure in the reaction vessel increasing in step with the decrease in the free gas space, but remaining within the limits indicated and the TFE concentration remaining essentially constant. In another preferred variant of the process according to the invention the feed of TFE is regulated in such a way that the total pressure during the period of polymerization remains constant and the TFE concentration decreases during this time, but remains within the limits given above.

Within the scope of the process according to the invention inert gases are any gaseous elements or compounds which are inert toward TFE, if appropriate, also toward modifying comonomers present, and toward the ingredients of the TFE polymerization, and which do not interfere with the polymerization. Preferably these are noble gases, such as helium, argon, krypton or neon, carbon dioxide or perfluorocarbon compounds, such as perfluoromethane or perfluoroethane, but especially nitrogen.

It should be noted that a polymerization of TFE with the addition of inert gases is mentioned in U.S. Pat. No. 2,394,293. The suspension polymerization of TFE described there is stated to be carried out in an aqueous phase under extremely high pressures. Pressures up to 35.2 bar (500 lbs./sq. in) are described as still effective, but the pressures actually used are substantially higher, namely within the range from 70 to 280 bar. In this regard these pressures are to be understood expressly as the TFE partial pressure; inert gas which may have been added is described simply and solely as an agent for increasing the pressure further. The addition of inert gas is not of critical importance. The pressures mentioned are the initial pressures; a feed of TFE during the polymerization is not envisaged.

Nothing is stated concerning a specific concentration of TFE to be maintained or concerning an effect on the polymer formed. It was therefore very surprising that in the process according to the invention the grain structure of the resulting TFE polymerization is influenced in an extremely advantageous manner by the addition of inert gas in a specific proportion. A suspension polymer of TFE prepared by a customary method has a greatly preponderant proportion of particles which have a fibre-like or filament-like shape or are particles having filament-like appendages, and this type of particle is responsible for the poor handling properties of the powder in the drying and grinding process. As a result of this the flow through the dryer is impeded in the drying process and hence the continuous feed to the gas jet mill is impeded, so that on-spec grinding poses great problems. Hence, the prior addition of a wet grinding stage is indispensable in continuous working up processes.

The product prepared by the process according to the invention has decidedly fewer filament-like particles or appendages of this type and has a considerably more uniform particle size, and thus is appreciably more easy to handle in working up. The result of this is that the TFE polymer when discharged flows more easily from the kettle and is easier to wash, and that it is possible to dispense completely with the wet grinding stage without problems arising in the drying process and in subsequent fine grinding in the gas jet mill.

The grindability of the TFE polymer prepared by the process according to the invention is also decidedly improved. Under the same grinding conditions, using a gas jet mill, a lower proportion of coarse material is observed in the case of the products prepared by the process according to the invention, as is evident from Table 2.

If an impact mill, for example a Zirkoplex sifter mill made by Alpine, is used, the improved grindability can be seen from the fact that, for the same energy consumption of the mill, the throughput of on-specification product which can be achieved per unit time is markedly higher for the product according to the invention.

Furthermore, the variant of the process according to the invention in which (with a decreasing TFE concentration) the total pressure is kept constant, brings a further advantage: the molecular weight distribution of the TFE polymer formed is considerably broader, and this, as is known, has a favorable effect on the properties of products shaped therefrom.

The invention is illustrated by means of the following examples.

EXAMPLE 1

100 l of demineralized water containing 6 g of ammonium oxalate in solution are charged to a 200 l enamelled kettle. The kettle is freed from any oxygen present by alternate evacuation and flushing with repurified nitrogen, and the temperature is adjusted to 15° C. 7 bar pressure of nitrogen and 6 bar pressure of TFE, corresponding to a total pressure of 13 bar, are then charged successively. The polymerization is initiated by a single addition of 150 mg of KMnO$_4$, dissolved in 100 ml of degassed water. TFE is fed in continuously during the polymerization at such a rate that the concentration of TFE in the gas space, which is reduced by the formation of polymer, in the kettle is not substantially altered. This is achieved by increasing the desired value of the TFE pressure regulator in stages in accordance with the decrease in gas volume. The decrease in gas volume is calculated from the amount of TFE which has been admitted into the kettle and measured cumulatively and from the density ($\rho = 2.3$ g/cm$^3$) of the PTFE formed. Thus the total pressure is thereby increased continuously during the polymerization, specifically after the formation of every 1 kg of PTFE. The composition of the gas phase is then 54 mol % of N$_2$ and 46 mol % of TFE. This composition of the gas phase remains essentially constant during the whole duration of polymerization. When the amount admitted reaches 40 kg, the total pressure is about 1.2 times the initial pressure. After said admitted amount of 40 kg has been reached, the polymerization is terminated by shutting the TFE valve and releasing the pressure.

The kettle is flushed several times with N$_2$ and the polymer is thereby degassed. Water is roughly separated from the suspension via a sieve. Here, as in all the following examples, the crude polymer is dried at 220° C. in a circulating air drying cabinet.

EXAMPLE 2

The kettle is charged as described in Example 1 and, after being evacuated and flushed with nitrogen, is placed under a pressure of 7 bar of N$_2$ and 6 bar of TFE, and the polymerization is initiated similarly with 150 mg of KMnO$_4$. As distinct from Example 1, however, the total pressure of 13 bar is kept constant during the whole polymerization by controlled feeding in of TFE, by adjusting the desired value of the pressure regulation to this value. After the amount admitted has reached 40 kg the polymerization is terminated.

In this test the gas phase is composed of 54 mol % of N$_2$ and 46 mol % of TFE at the start of the polymerization and of 65 mol % of N$_2$ and 35 mol % of TFE at the end of the polymerization.

EXAMPLE 3

Procedure as in Example 1, but highly purified carbon dioxide is used as the inert gas instead of nitrogen.

EXAMPLE 4

Procedure as in Example 2, but highly purified carbon dioxide is used instead of nitrogen.

EXAMPLE 5

Procedure as in Example 1, but argon is used as the inert gas instead of nitrogen.

EXAMPLE 6

Procedure as in Example 1, but helium is used as the inert gas instead of nitrogen.

EXAMPLE 7

Comparison example

The kettle is charged and blanketed with inert gas as described in Example 1. After evacuation to remove the flushing nitrogen, a pressure of 6 bar of TFE is charged and the polymerization is initiated by a single addition of 150 mg of potassium permanganate. The pressure is kept constant for the whole period of polymerization and is terminated when the amount admitted has reached 40 kg.

EXAMPLE 8

Comparison example

The test is carried out as in Example 2, with the total pressure being kept constant, but with the difference that at the start of the polymerization the composition of the gas phase is 25 mol % of N$_2$ and 75 mol % of TFE at a total pressure of 8 bar. At the end of the reaction the composition of the gas phase is 30 mol % of N$_2$ and 70 mol % of TFE.

EXAMPLE 9

The 200 l kettle is charged with 100 l of demineralized water in which 40 g of (NH$_4$)$_2$CO$_3$ have been dissolved and is blanketed with inert gas by alternate evacuation and flushing with N$_2$, and the temperature is adjusted to 70° C. 10 g of PPVE are then in and a pressure of 5.5 bar of N$_2$ and 10 bar of TFE is charged. The polymerization is initiated by a single addition of 3 g of ammonium persulfate, dissolved in 100 ml of degassed water. PPVE is metered in in stages during the polymerization, after every 1 kg of PTFE, specifically about 1.5 g per kg of PTFE, making a total of 60 g.

A total pressure is kept constant during the whole time of polymerization. After the amount admitted has reached 40 kg the polymerization is terminated by discontinuing the addition of TFE and releasing the pressure.

At the start of the polymerization the composition of the gas phase is 64.5 mol % of TFE and 35.5 mol % of N$_2$; at the end of the polymerization it is 57.4 mol % of TFE and 42 6 mol % of N$_2$.

EXAMPLE 10

As Example 9, with the difference that 8 bar of N$_2$ and 8 bar of TFE are charged into the kettle at the start of polymerization. Here too the total pressure of 16 bar is kept constant for the duration of polymerization, and the polymerization is terminated when the amount admitted is 40 kg. The composition of the gas phase at the start of polymerization is 50 mol % of TFE and 50 mol % of N$_2$; at the end of polymerization it is 40 mol % of TFE and 60 mol % of N$_2$.

EXAMPLE 11

Comparison example

The polymerization is carried out as described in Example 9, with the difference that no nitrogen is charged, so that the polymerization is carried out under a constant TFE pressure of 10 bar.

EXAMPLE 12

Comparative Example

Procedure as in Example 11, but with the difference that the polymerization is carried out under a constant TFE pressure of 8 bar.

The dried crude polymer is subjected to a dry sieve analysis in accordance with ASTM Specification D 1457-88. A sieve setup made by Haver & Boecker, Model Haver EML 200-89 having a set of sieves of 3000, 2000, 1800, 1400, 1000, 800, 600, 400 and 200 μm is used in this analysis.

The results in Table 1 are listed in cumulative form in accordance with ASTM Standard Specification D 1457-88. These results make it possible to assess the effect of the particle size distribution very simply via the $d_{50}$ value, which is also shown. The reduction in this value in the case of the polymers obtained by the process according to the invention rests mainly on the markedly reduced proportion of fibrous particles in the crude polymer.

The particle size distribution and the particle shape can be influenced to a certain extent by the particular conditions of stirring and by the roughness of the wall surface of the reaction vessel. Therefore all the tests listed in Table 1 were carried out in the same kettle and with the same stirring conditions.

The dried crude polymer is also ground, under identical grinding conditions for all the examples and comparison examples listed here, without prior wet grinding via a metering hopper through a metering screw into an air jet mill made by Alpine, model 315 AS. The grinding conditions are room temperature and an input pressure of 5 bar. The metering rate is 14.5 kg/h in Examples 1 to 8, and 8.5 kg/h in Examples 9 to 12. The lower metering rate in Examples 9 to 12 is necessary, because, as is known, the modified TFE suspension polymers are basically more difficult to grind than the polymers which have been prepared without the addition of modifying agents. In each case 15 kg of crude polymer are ground.

The ground product is subjected to a wet sieve analysis in accordance with said ASTM Standard Specification. An instrument made by Haver & Boecker having a set of sieves of 100, 75, 50 and 33 μm is used in this analysis.

The results of this wet sieving are listed in Table 2, also in cumulative form. This table documents the improved grindability of the products of the process according to the invention through the increase in the fraction <33 μm and through the reduction in the fractions >50 μm.

TABLE 1

| | Integral particle size distribution of the crude polymer | | | | | | | | |
|---|---|---|---|---|---|---|---|---|---|
| Example No. | >3000 μm | >2000 μm | >1400 μm | >1000 μm | >800 μm | >600 μm | >400 μm | >200 μm | $d_{50}$ μm |
| 1 | 10.0 | 15.0 | 27.0 | 44.9 | 63.8 | 81.8 | 96.3 | 100 | 950 |
| 2 | 4.2 | 10.0 | 25.4 | 45.5 | 63.3 | 80.4 | 96.3 | 100 | 950 |
| 3 | 10.9 | 15.0 | 25.5 | 44.1 | 63.1 | 82.9 | 96.7 | 99.9 | 940 |
| 4 | 3.7 | 12.6 | 31.1 | 52.2 | 68.7 | 85.0 | 97.8 | 99.9 | 1040 |
| 5 | 1.9 | 7.5 | 23.8 | 42.8 | 62.5 | 81.1 | 96.7 | 100 | 930 |
| 6 | 3.8 | 19.0 | 38.5 | 54.5 | 67.5 | 82.8 | 97.2 | 99.9 | 1110 |
| 7 | 13.6 | 29.7 | 47.8 | 52.9 | 63.4 | 80.8 | 97.4 | 100 | 1230 |
| 8 | 11.9 | 18.2 | 39.5 | 70.9 | 89.4 | 97.3 | 99.8 | 100 | 1270 |
| 9 | 0 | 1.2 | 8.5 | 31.4 | 51.2 | 59.7 | 80.0 | 98.9 | 810 |
| 10 | 0 | 1.6 | 6.4 | 26.0 | 45.1 | 54.9 | 80.5 | 98.4 | 720 |
| 11 | 2.1 | 6.6 | 15.1 | 44.9 | 58.2 | 63.5 | 81.5 | 97.5 | 910 |
| 12 | 1.7 | 6.4 | 16.6 | 46.7 | 61.0 | 66.8 | 82.6 | 98.2 | 960 |

TABLE 2

| | Cumulative particle size distribution of the ground product | | | | |
|---|---|---|---|---|---|
| Example No. | >100 μm | >75 μm | >50 μm | >33 μm | <33 μm |
| 1 | 0.2 | 0.4 | 4.0 | 18.0 | 82.0 |
| 2 | 0.5 | 1.0 | 5.0 | 21.0 | 79.0 |
| 3 | 0 | 0.2 | 0.6 | 1.2 | 98.8 |
| 4 | 0 | 0.2 | 0.8 | 1.6 | 98.4 |
| 5 | 0 | 0 | 0.5 | 0.8 | 99.2 |
| 6 | 0 | 0 | 0.1 | 0.4 | 99.6 |
| 7 | 1.0 | 4.5 | 11.0 | 36.0 | 64.0 |
| 8 | 1.0 | 1.8 | 9.1 | 30.3 | 69.7 |
| 9 | 0 | 0.5 | 4.6 | 14.6 | 85.4 |
| 10 | 0 | 0.2 | 1.3 | 7.6 | 92.4 |
| 11 | 0.3 | 2.2 | 11.4 | 28.1 | 71.9 |
| 12 | 0.2 | 1.2 | 7.5 | 23.1 | 76.9 |

We claim:

1. A process for the preparation of a non-melt-fabricable granular tetrafluoroethylene polymer by suspension polymerization of tetrafluoroethylene and 0 to 0.6 mol % of a modifying comonomer in an aqueous phase in the presence of free-radical forming initiators, which comprises a mixture of tetrafluoroethylene and an inert gas being charged under pressure before starting the polymerization, wherein the total pressure of the charged mixture is 5 to 50 bar and the concentration of the tetrafluoroethylene in this mixture is 30 to 70 mol %, said concentration being kept within this range by an appropriate feed of tetrafluoroethylene during the polymerization.

2. The process as claimed in claim 1 for the preparation of a non-melt-fabricable granular tetrafluoroethylene polymer, wherein the total pressure of the charged mixture is 5 to 30 bar.

3. The process as claimed in claim 1 for the preparation of a non-melt-fabricable granular tetrafluoroethylene polymer, wherein tetrafluoroethylene is fed in during the polymerization essentially at the rate at which it is consumed.

4. The process as claimed in claim 1 for the preparation of a non-melt-fabricable granular tetrafluoroethylene polymer, wherein tetrafluoroethylene is fed in during the polymerization at such a rate that the total pressure remains essentially constant.

5. The process as claimed in claim 1 for the preparation of a non-melt-fabricable granular tetrafluoroethylene polymer, wherein the inert gas is nitrogen.

6. The process as claimed in claim 1 for the preparation of a non-melt-fabricable granular tetrafluoroethylene polymer, wherein tetrafluoroethylene and 0.05 to 0.4 mol % of a modifying comonomer are polymerized.

7. The process as claimed in claim 1 for the preparation of a non-melt-fabricable granular tetrafluoroethylene polymer, wherein the modifying comonomer employed is hexafluoropropylene, perfluoropropyl perfluorovinyl ether or chlorotrifluoroethylene.

* * * * *